Feb. 6, 1962     R. A. PROSSER     3,019,739
HIGH PRESSURE PUMPING APPARATUS

Filed March 23, 1959     2 Sheets-Sheet 1

Fig. 1.

INVENTOR
RAE A. PROSSER
BY
William F. Mesinger
ATTORNEY

INVENTOR
RAE A. PROSSER

United States Patent Office 3,019,739
Patented Feb. 6, 1962

3,019,739
HIGH PRESSURE PUMPING APPARATUS
Rae A. Prosser, South Charleston, W. Va., assignor to Union Carbide Corporation, a corporation of New York
Filed Mar. 23, 1959, Ser. No. 801,318
11 Claims. (Cl. 103—204)

This invention relates to novel means for delivering fluids at extremely high pressures, and more particularly it relates to novel means for leak-tightly separating the high pressure fluid from a packing lubricating fluid by a seal around a reciprocating plunger.

In many fields of technology, new developments have created a need for processing fluids at extremely high pressures, such as 2000 atmospheres or more. An immediate problem therefore is to provide a pump for generating such pressures. Since a pump contains relatively movable parts, one of the most important problems is to provide some type of sealing mechanism which will contain the generated pressure. The prior art has employed various types of stuffing box packings on the fluid compression side of pumps for this purpose, but one limiting factor is that such packing must not only withstand the pressures but also the abrasion it receives from a constant reciprocating movement of the plunger. Non-lubricated packings are currently being used which withstand the wear from friction in operation up to about 40,000 pounds per square inch discharge pressure for a limited time. It is desirable however to increase the maximum continuous operating period of ultra-high pressure pumps or intensifiers by reducing the frequency of shut-downs necessary for replacement of packing.

It is also known that the operating life of high pressure packing can be increased significantly if the packing is properly lubricated. However, there is an extremely difficult problem in obtaining effective lubrication of the packing material without lubricant contamination of the pumped fluid when fluids other than the lubricant are to be pressurized.

It will also be apparent that the upper limit of discharge pressures attainable with presently available intensifiers is somewhat limited by the relatively short packing life of such apparatus. That is, higher discharge pressures would produce even more friction between the reciprocating plunger and the packing section, and consequently even shorter packing life which of necessity is precluded by the commercial needs for reasonably continuous operation.

It is an object of this invention to provide a novel means for sealing a reciprocating plunger shaft which is capable of maintaining extremely high pressures for longer periods than heretofore obtained without necessitating shut-downs for packing replacement. It is another object of this invention to provide a pumping apparatus utilizing the herein described novel sealing arrangement. A further object of the invention is to provide an improved means for effectively lubricating the high pressure stuffing box packing of a reciprocating plunger without contaminating the pumped fluid with such lubricant. A still further object is to provide an improved pumping apparatus which may be continuously operated at higher discharge pressures than heretofore attained, for relatively long periods without packing failure.

These and other objects of the present invention will in part be obvious and in part become apparent from the following descriptions and drawing in which:

FIG. 1 is a view of a longitudinal section through a pumping apparatus according to one embodiment of the invention;

In the drawings similar items of apparatus in the several figures are designated by similar reference characters.

Figure 2:
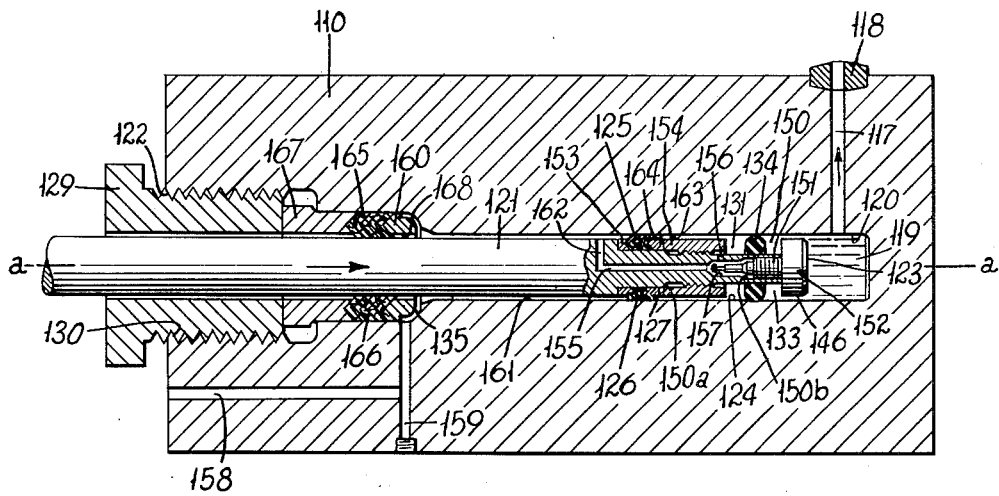
FIG. 2 is a view of a longitudinal section through the cylinder block of a pumping apparatus of another embodiment during the compression stroke.

The above objects are attained by providing an assembly including a housing containing an axial bore having a pumping chamber in one end and an opening at the other end. Means are also provided for introducing the fluid to be compressed into the pumping chamber at a suction pressure; a discharge passage also communicates with the pumping chamber. A reciprocating plunger extends through the axial bore opening and has an inner pumping end closing the pumping chamber. An annular cavity is formed between at least one portion of the reciprocating plunger and the walls of the axial bore. A packing section is annularly located between the reciprocating plunger and the walls of the axial bore, and longitudinally positioned between the annular cavity and the axial bore opening. The packing section is contiguously arranged with the annular cavity, and seals fluid pressure developed in such cavity from the atmosphere. Means are provided for introducing a fluid lubricant into a first section of the annular cavity, such first section being contiguously associated with the packing section so that the fluid serves to lubricate such packing section. Suitable means, preferably a check valve, are provided for maintaining the fluid lubricant at a pressure sufficiently above the suction pressure so as to allow lubricant flow into the first section of the annular cavity during each suction stroke. The annular cavity also has a second section which contains compressed fluid during at least the compression stroke of the reciprocating plunger.

An annular floating seal is transversely arranged and constructed in the annular cavity to separate the lubricant-containing first section from the further compressed fluid-containing second section. Such floating seal is adapted to move in a direction parallel to the axis of reciprocation of said plunger and thereby change the relative volumes of the first and second sections as required by the compressibility of the fluid lubricant. That is, at the extreme high discharge pressures of the present pump or intensifier, the compressibility of the lubricant fluid will change slightly even though such fluid may be in the liquid phase at atmospheric pressure. Consequently, during the compression stroke the increased pressure exerted by the pumped fluid on the floating seal will cause the sealing member to move a short longitudinal distance in a direction parallel to the axis of plunger reciprocation, and away from the pumping chamber. Thus, during the compression stroke the volume of the first cavity section is reduced and the volume of the second cavity section is increased. Conversely, during the succeeding suction stroke fresh lubricant may be introduced in the first section of the annular cavity and the sealing member will move a short distance in the opposite direction so as to increase the volume of the first section relative to the volume of the second section. In this manner, the floating seal completely separates the lubricating fluid and the compressed fluid thus preventing contamination of the latter by the lubricating fluid. At the same time, the lubricated annular packing section seals and maintains the lubricant pressure against the atmosphere.

A fixed position seal between the first and second sections of the annular cavity would not achieve the same advantageous results as the floating seal of the present invention since pumped fluid on the compression stroke would seep through the seal to occupy the space in the first section vacated by the compressed lubricant. Then when pressure is released, the trapped pumped fluid mixed with the lubricant would leak back through the seal into the second section thereby contaminating the pumped fluid with lubricant. The present floating seal is able to move when only enough differential pressure is supplied between the two cavity sections to overcome the friction between the floating seal and the walls of the plunger and axial bore. The actual differential pressure across the floating seal remains comparatively small at all times, and may for example be less than 300 p.s.i. The seal therefore need not press as tightly on the reciprocating plunger as the packing presses against either the plunger or the axial bore walls.

Various floating seal configurations are believed satisfactory for practicing the present invention. These seals include a metal sleeve bounded on either side by rings, or a series of leather U-rings. Alternatively the floating seal may be a ring formed, for example, from a heavily substituted halogen-containing plastic such as polytetrafluoroethylene or polymonochlorotrifluoroethylene. The ring may have a cross-section which is circular, oval, square, rectangular, or any other suitable configuration.

Essentially any fluid which is compatible with the materials of construction may be pumped by the present apparatus, as for example water or liquefied hydrocarbons such as ethylene, propylene, and propane. The present invention is most advantageously employed where it is necessary to pump liquid to high pressures without contamination by the pump lubricant.

Referring now more specifically to FIG. 1, pump or intensifier cylinder block 10 is bounded on one side by valve assembly block 11 and on another side by lubricant supply assembly block 12. These blocks may be formed from any materials of construction which can withstand the pressures involved and which are compatible with the fluids being processed therethrough. For example, heat-treated steel is a suitable construction material. The fluid to be pumped, for example ethylene liquid, is introduced into valve assembly block 11 through inlet valve 13 at a suction pressure, for example 2000 p.s.i.g. Schematically illustrated inlet valve 13 may be any of several well-known types of suction valves commonly used by the art, but is preferably the poppet type. The fluid at the aforementioned suction pressure flows through passageway 14 connecting inlet valve 13 with closed discharge valve 15, and is directed through branch passageway 16. The section of branch passageway 16 in valve assembly block 11 communicates with a corresponding section 17 of such passageway in pump cylinder block 10, the communicating ends being sealed by gasket 18 which is preferably the metallic ring type. The opposite end of fluid passageway 17 communicates with pumping chamber 19 in the closed end of axial bore 20.

Plunger element 21 connected to a reciprocating mechanism (not shown) extends through the open end 22 of axial bore 20 and has an inner pumping end 23 closing pumping chamber 19. An annular cavity 24 is provided between one portion of the reciprocating plunger 21 and the walls of axial bore 20, and is longitudinally located between pumping chamber 19 and axial bore open end 22. A packing section indicated generally at 25 is annularly located between plunger 21 and the walls of axial bore 20, and is longitudinally positioned between annular cavity 24 and the axial bore open end 22. Annular packing section 25 is contiguously arranged with annular cavity 24 and serves to seal fluid pressures developed therein, as will be subsequently explained in detail.

Annular packing section 25 may be formed from materials and combinations thereof in a manner well known to those skilled in the art. However, it has been found that an assembly comprising a series of chevron-type seals 26 formed of leather and bounded on the pumping chamber side by a metal bottom packing former 27 and on the axial bore open end side by a metal packing follower 28, is particularly advantageous. The packing assembly 25 is held in place by a follower nut 29 which is thread-connected to the walls of an enlarged section 30 of the axial bore 20 communicating with the open end 22 thereof.

Referring more specifically to the annular cavity 24, this space has a first section 31, containing a suitable fluid lubricant such as mineral oil, animal fat or synthetic oil. Lubricant section 31 communicates with and is contiguously arranged with respect to annular packing section 25 so as to facilitate lubricant flow into the packing. Restricted flow passageways 32 through bottom packing former 27 are provided for lubricant flow from lubricant section 31 into the space around and between chevron-type seals 26 for lubrication thereof so as to increase their operating life.

Annular cavity 24 also has a second section 33 which is filled with compressed fluid during at least the compression stroke of the pumping cycle. That is, during the compression stroke a small quantity of the compressed fluid leaks from the pumping chamber 19 into second cavity section 33 through the intervening zone of sliding contact between the plunger 21 and the axial bore 20. The lubricant-containing first section 31 and the compressed fluid-containing second section 33 are leak-tightly separated by an annular floating seal 34. The last-mentioned element is preferably an O-ring having an oval cross-section with the long axis oriented in a direction parallel to the axis of plunger reciprocation $a$—$a$, so as to provide maximum sealing surfaces. The outer periphery of floating seal 34 contacts the walls of annular cavity 24 while the inner wall of the floating seal contacts the surface of reciprocating plunger 21, the respective fits being sufficiently tight to prevent leakage thereby, and on the other hand sufficiently loose to provide the necessary floating characteristic. As previously discussed, seal 34 is adapted to move in a direction parallel to the axis of reciprocation $a$—$a$ of plunger 21 and thereby change the relative volumes of the first and second sections 31 and 33 as required by the compressibility of the fluid lubricant.

The fluid lubricant is introduced into first lubricant-containing section 31 through passageway 35 in bottom packing former 27, the ends of such passageway communicating with first cavity section 31 and drilling 36 through pump cylinder block 10. The opposite end of drilling 36 in turn communicates with drilling 37 in lubricant supply assembly block 12, the connecting ends being sealed by gasket 38 which is preferably the metallic ring type. Pressure is always maintained on the lubricating fluid from an outside source at a small differential above that of the pump suction pressure so as to allow additional lubricating fluid to enter first section 31 of annular cavity 24 during each suction stroke if there is space therein to receive the lubricant. Suitable means for maintaining the desired lubricant pressure may for example comprise check valve assembly 39 containing ball valve 40. This assembly is contained in cavity 41 of lubricant supply assembly block 12, and is leak-tightly sealed by nut 42 which is thread-connected to the walls of cavity 41. Pressurized lubricating fluid is introduced into drilling 37 on the upstream side of check valve assembly 39 through connecting conduit 43, the latter in turn communicating with lubricating fluid inlet conduit 44 which passes through an opening in the wall of cavity 41. Lubricating fluid inlet conduit 44 in turn extends through a drilling in nut 45, the latter being thread-connected to the walls of a recessed section of lubricant supply assembly block 12. Thus, check valve assembly cavity 41 is effectively sealed from the atmosphere on all sides.

The pump operates as follows: During the suction stroke, fluid to be pumped for example at 2000 p.s.i.g. flows into pumping chamber 19 and simultaneously lubricating fluid is introduced into first cavity section 31 through passageway 35 at a pressure slightly above the suction pressure. Such fresh lubricant refills first section 31 thereby compensating for the quantity of fluid having been used to lubricate the series of chevron seals 36 during the previous compression stroke. The differential pressure between the first and second cavity sections 31 and 33 respectively, is sufficient to move floating seal 34 in a direction parallel to the axis of plunger reciprocation a—a and towards pumping chamber 19. Such movement continues until the floating seal 34 contacts and is stopped by the ridged inner end 46 of annular cavity 24, thereby maintaining the seal and preventing contamination of the pumped fluid with lubricant. It is to be noted that at the end of the suction stroke of this particular illustrated embodiment, the lubricant-containing first section 31 comprises substantially the entire volume of the annular cavity 24.

During the compression stroke, most of the compressed fluid is directed from pumping chamber 19 through connecting passageways 17 and 16 into passageway 14 for discharge through valve 15 (schematically illustrated), which for example may be substantially identical to the poppet type inlet valve 13. The discharge pressure may for example be in the range of 20,000 to 50,000 p.s.i.g., or even higher. A small portion of the compressed fluid leaks from pumping chamber 19 between the walls of axial bore 20 and reciprocating plunger 21, and into the second section 33 of annular cavity 24. Since the compressed fluid reaching second section 33 is at a higher pressure than the pressure imposed on the lubricating fluid in first section 31, a sufficient pressure differential is established therebetween to move the floating seal 34 in a direction away from the ridged end 46 and towards bottom packing former 27. The lubricating fluid is thus compressed in first section 31 and a portion of such fluid flows through restricted passages 32 of bottom packing former 27 into the space between chevron seals 26 for lubrication thereof. If an expandable floating seal is used, such seal will expand transversely as pressure is increased during the compression stroke so as to form a tight seal and wipe the lubricating fluid from the plunger and cylinder walls during movement of the two components.

It can thus be seen from the foregoing description that the floating seal 34 of the present invention moves during the pumping cycle in a direction parallel to the axis of reciprocation so as to compensate for the compressibility of the lubricating fluid. Also, packing section 25 maintains the lubricating fluid in intimate contact with floating seal 34, and consequently in indirect contact with the pumped fluid.

The remarkable advantages of the present invention were clearly illustrated in one series of comparative accelerated destructive tests in which an intensifier similar to that illustrated in FIG. 1 was operated with and without packing lubrication. Chevron or V-cross section type packing was used, and during these tests a mixture of "Stoddard" solvent and a petroleum-based lubricating oil was further compressed from a suction pressure of 2000 p.s.i.g. to a discharge pressure of 60,000 p.s.i.g. When the intensifier was operated without packing lubrication, the packing life was only 15 to 90 minutes for two different tests. However, when the chevron-type packing was lubricated with the aforementioned mixture, the packing life was increased to 150 and 269 minutes of continuous operation for two different tests. It can thus be seen that use of the present invention can facilitate at least a three-fold increase in packing life over that attainable in conventional ultra-high pressure pumping apparatus where packing lubrication is precluded because of the danger of contaminating the fluid being pumped.

Figure 3:
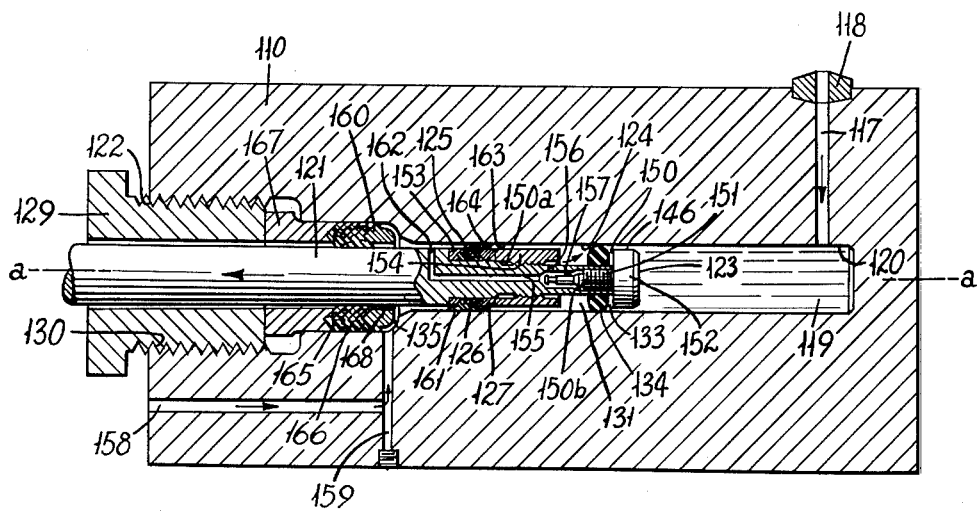
FIG. 3 is a view of a longitudinal section through the cylinder block of the FIG. 2 embodiment during the suction stroke.

FIGS. 2 and 3 illustrate another embodiment of the present invention in which the annular packing section comprises part of the plunger assembly and reciprocates therewith. Referring now more specifically to the drawings, FIG. 2 illustrates the pump during the compression or discharge stroke and FIG. 3 illustrates the same pump during the suction stroke. In the interest of simplicity, the valve assembly block has not been illustrated although it is to be understood that a block substantially identical to block 11 would be suitable for fluid communication with intensifier cylinder block 110. The fluid to be pumped is introduced into pumping chamber 119 through passageway 117 during the suction stroke, and passed therethrough in reverse direction during the discharge stroke as high pressure fluid.

The inner section of reciprocating plunger 121 is stepped down in diameter, and the end 150 of the stepped-down section 150a is longitudinally bored and internally threaded to form internal cavity 150b which receives sleeve 151. This sleeve in turn has an enlarged head section 152 which is sized to have a close clearance, such as 0.001 inch, from the walls of axial bore 120 and thus constitute the inner end 123 of the plunger assembly. Annular packing section 125 is positioned and compressed against plunger ridged surface 153 by adjusting nut 154 which is thread-connected to the stepped-down plunger section 150a. One side of adjusting nut 154 bears against the bottom packing former 127, and the other side of such adjusting nut provides the outer wall of annular cavity section 124. Thus, cavity section 124 is transversely bounded on opposite sides by adjusting nut 154 and enlarged head section 152. Also, annular cavity section 124 is longitudinally bounded by stepped-down plunger section 150a and the wall of axial bore 120.

Cavity section 124 includes lubricant-containing first section 131 transversely bounded on one end by adjusting nut 154 and on the other end by floating seal 134. The pumped fluid-containing second section 133 of annular cavity 124 is also transversely bounded on one end by floating seal 134 and on the other end by the enlarged head section 152 of sleeve 151.

Pressurized lubricating fluid is introduced into the first section 131 through connecting longitudinal passageway 155 extending through a section of the plunger body 121. Longitudinal passageway 155 is parallel to the axis of reciprocation of plunger 121, and the centerline of such passageway preferably coincides with this axis. Transverse passageway 156 communicates at one end with the enlarged inner end 157 of longitudinal passageway 155 and at the other end with the lubricant-containing first cavity section 131, passageway 156 for example being substantially normal to longitudinal passageway 155.

The pressurized lubricating fluid is introduced through longitudinal drilling 158 and connecting lateral drilling 159 in intensifier cylinder block 110. The inner end of lateral drilling 159 communicates with inclined passageways 135 in bottom packing former 160. In this manner, a portion of the pressurized lubricant entering inclined passageways 135 flows inwardly through the annular space 161 between reciprocating plunger 121 and the axial bore 120. The inwardly flowing lubricant is stopped by the high-pressure seals 126 preferably of the chevron type, and passes into lateral drillings 162 which, for example, may be uniformly spaced around the circumference of plunger 121. The inner ends of lateral drillings 162 converge on the axis of reciprocation a—a of plunger 121, and manifold into longitudinal passageway 155. Thus, pressurized lubricant flows consecutively through lateral drillings 162 and longitudinal passageway 155, and thence through enlarged passageway end 157 and transverse passageway 156 into lubricant-containing first section 131.

The pump embodiment of the present invention illustrated in FIGS. 2 and 3 operates in a manner very similar to that described in conjunction with the FIG. 1 embodiment. One significant difference however is that the high pressure packing section 125 forms a part of the plunger assembly and reciprocates therewith, and serves to seal the pressure within the pump from the lubrication supply system. The chevron-type seals 126 of such section are lubricated by the consecutive flow of fluid from first cavity section 131 through connecting restricted flow drillings 163 and 164 in adjusting nut 154 and bottom packing former 127, respectively. During the compression stroke, a small portion of the compressed fluid flows in a longitudinal direction from the pumping chamber 119, between the outer walls of enlarged head section 152 and the walls of axial bore 120 into the second section 133 of annular cavity 124. As previously described this restricted flow establishes a sufficient pressure differential between the first and second sections of annular cavity 124 so as to move floating seal 134 away from pumping chamber (see FIG. 2). During the suction stroke, fresh lubricant is introduced in first section 131 and the floating seal 134 moves in the opposite direction parallel with the axis of plunger reciprocation a—a until stopped by the rigid surface 146 of enlarged head section 152, thereby maintaining the desired seal (see FIG. 3).

Another distinguishing feature of the FIG. 2 and 3 embodiment of the invention is the provision of a low pressure packing section 165 which is simultaneously lubricated with the aforedescribed high pressure packing section 125. Low pressure packing section 165 may be formed from materials and combinations thereof in a manner well known to those skilled in the art. However, packing section 165 preferably comprises an assembly including a series of chevron-type seals 166 formed of leather and bounded on the pumping chamber side by metal bottom packing former 160. On the axial bore open end side, seals 166 are preferably bounded by a metal packing follower 167. The low pressure packing assembly 165 is held in place by a follower nut 129 which is thread-connected to the walls of an enlarged section 130 of the axial bore 120 communicating with the open end 122 thereof. Thus, when pressurized lubricating fluid is introduced through passageways 135 into the annulus around reciprocating plunger 121, the portion of such fluid not flowing inwardly through space 161 flows outwardly in the opposite direction through restricted flow passageways 168 in low pressure bottom packing former 160. The last mentioned passageways communicate with chevron seals 166 and the space therebetween, so that the pressurized lubricant entering this section from passageways 168 serves to lubricate and extend the packing operating life in a manner analogous to that of high pressure packing 126.

It is contemplated that various modifications of the pumping apparatus may be made without departing from the spirit and scope of the invention herein described. For example, lubricant longitudinal passageway 155 may extend to the outer end of plunger 121 instead of only extending through an inner section of the plunger body, as illustrated in FIGS. 2 and 3.

What is claimed is:

1. A lubricated reciprocating plunger assembly for producing high pressures on fluids which comprises a housing containing an axial bore having an opening at one end; a reciprocating plunger extending through the axial bore opening and having an inner pumping end; an annular cavity between at least one portion of said reciprocating plunger and the walls of said axial bore; a floating seal in said annular cavity dividing said cavity into a first section longitudinally located between the axial bore opening and said seal and a second section longitudinally located between said seal and the inner pumping end of said reciprocating plunger; an annular packing section between said reciprocating plunger and the walls of said axial bore, shaped and arranged to facilitate lubrication and longitudinally located between said annular cavity and the axial bore opening, said annular packing section being contiguous to said annular cavity and serving to seal fluid pressures developed in such cavity; means for introducing a fluid lubricant into said first section of said annular cavity contiguously associated with said annular packing section, such fluid serving to lubricate the packing section; means for maintaining said fluid lubricant at a pressure above the suction pressure so as to allow lubricant flow into said first section during the suction stroke; said second section in said annular cavity containing compressed fluid during at least the compression stroke of said reciprocating plunger; said floating seal being transversely arranged and constructed in said annular cavity to separate the first lubricant-containing section from the second compressed fluid-containing section, said floating seal being adapted to move in a direction parallel to the axis of reciprocation of said plunger and thereby adjust the relative volumes of said first and second sections as required by the compressibility of said fluid lubricant.

2. A lubricated reciprocating plunger assembly for producing high pressures on fluids which comprises a housing containing an axial bore having a pumping chamber in one end and an opening at the other end; means for introducing said fluid into said pumping chamber at a suction pressure; a discharge passage communicating with said pumping chamber; a reciprocating plunger extending through the axial bore opening and having an inner pumping end closing said pumping chamber; an annular cavity between at least one portion of said reciprocating plunger and the walls of said axial bore; a floating seal in said annular cavity dividing said cavity into a first section longitudinally located between the axial bore opening and said seal and a second section longitudinally located between said seal and said pumping chamber; an annular packing section between said reciprocating plunger and the walls of said axial bore, shaped and arranged to facilitate lubrication and longitudinally located between said annular cavity and the axial bore opening, said annular packing section being contiguous to said annular cavity and serving to seal fluid pressures developed in such cavity; means for introducing a fluid lubricant into said first section of said annular cavity contiguously associated with said annular packing section, such fluid serving to lubricate the packing section; means for maintaining said fluid lubricant at a pressure above said suction pressure so as to allow lubricant flow into said first section during the suction stroke; said second section in said annular cavity containing compressed fluid during at least the compression stroke of said reciprocating plunger; said floating seal being transversely arranged and constructed in said annular cavity to separate the first lubricant-containing section from the second compressed fluid-containing section, said floating seal being adapted to move in a direction parallel to the axis of reciprocation of said plunger and thereby adjust the relative volumes of said first and second sections as required by the compressibility of said fluid lubricant.

3. An apparatus for producing high pressures on fluids which comprises a housing containing an axial bore having a pumping chamber in one end and an opening at the other end; means for introducing said fluid into said pumping chamber at a suction pressure; a discharge valve and a discharge valve-controlled outlet passage communicating with said pumping chamber; a reciprocating plunger extending through the axial bore opening and having an inner pumping end closing said pumping chamber; an annular cavity between at least one portion of said reciprocating plunger and the walls of said axial bore; a floating seal in said annular cavity dividing said cavity into a first section longitudinally located between the axial bore opening and said seal and a second section longitudinally located between said seal and said pumping chamber; an annular packing section between said reciprocating plunger and the walls of said axial bore, shaped and arranged to facilitate lubrication and longitudinally located between said annular cavity and the axial bore opening, said annular packing section being contiguous to said annular cavity and serving to seal fluid pressures developed in such cavity; means for introducing a fluid lubricant into said first section of said annular cavity contiguously associated with said annular packing section, such fluid serving to lubricate the packing section; means for maintaining said fluid lubricant at a pressure slightly above said suction pressure so as to allow lubricant flow into said first section during the suction stroke; said second section in said annular cavity containing compressed fluid during at least the compression stroke of said reciprocating plunger; said floating seal being transversely arranged and constructed in said annular cavity to separate the first lubricant-containing section from the second compressed fluid-containing section, said floating seal being adapted to move in a direction parallel to the axis of reciprocation of said plunger and thereby adjust the relative volumes of said first and second sections as required by the compressibility of said fluid lubricant.

4. The lubricated reciprocating plunger assembly of claim 2 in which said floating seal is at least one ring.

5. The lubricated reciprocating plunger assembly of claim 2 in which said floating seal is an O-ring having an oval cross-section with the long axis oriented in a direction parallel to the axis of plunger reciprocation.

6. The lubricated reciprocating plunger assembly of claim 2 in which said floating seal is an assembly comprising a metal sleeve bounded on either side by rings.

7. The lubricated reciprocating plunger assembly of claim 2 in which said floating seal is at least one ring formed from a heavily substituted halogen-containing plastic.

8. The lubricated reciprocating plunger assembly of claim 2 in which said annular packing section is an assembly comprising a series of chevron seals bounded on one side by a metal packing follower and on the other side by a metal packing former, such packing former being contiguously associated with the annular cavity first section and having restricted passage means therethrough for restricted flow of said lubricating fluid to lubricate said chevron seals.

9. The lubricated reciprocating plunger assembly of claim 2 in which the fluid lubricant-introducing means comprises a passageway extending through at least a section of the body of said reciprocating plunger and having one end communicating with the first section of said annular cavity, the centerline of said passageway coinciding with the axis of reciprocation of said plunger.

10. The lubricated reciprocating plunger assembly of claim 2 in which a second annular packing section is provided between said reciprocating plunger and the walls of said axial bore opening, and is longitudinally located between said annular packing section and the axial bore opening, and means are provided for introducing a portion of said fluid lubricant into said second annular packing section.

11. The lubricated reciprocating plunger assembly of claim 2 in which fluid lubricant-introducing means comprises a passageway extending through a section of the reciprocating plunger body and having one end communicating with the first section of said annular cavity, and in which a second annular packing section is provided between said reciprocating plunger and the walls of said axial bore opening and is longitudinally located between said annular packing section and the axial bore opening, and means are provided for introducing a portion of said fluid lubricant into said second annular packing section.

References Cited in the file of this patent
UNITED STATES PATENTS

| | | |
|---|---|---|
| 1,188,097 | Pearsons | June 20, 1916 |
| 1,260,100 | Udell | Mar. 19, 1918 |
| 2,572,952 | Rymal | Oct. 30, 1951 |
| 2,683,060 | Wise et al. | July 6, 1954 |
| 2,827,860 | Roberts | Mar. 25, 1958 |
| 2,898,867 | Saalfrank | Aug. 11, 1959 |

FOREIGN PATENTS

| | | |
|---|---|---|
| 316,184 | Germany | Dec. 9, 1919 |